June 24, 1952      T. S. LASKY      2,601,404

OIL FILTER

Filed April 12, 1950

Thomas S. Lasky
INVENTOR.

Patented June 24, 1952

2,601,404

UNITED STATES PATENT OFFICE 2,601,404

OIL FILTER

Thomas S. Lasky, Kingston, Pa.

Application April 12, 1950, Serial No. 155,409

4 Claims. (Cl. 210—131)

This invention relates to oil filters of the type shown in my U. S. Patent No. 2,487,146, November 8, 1949.

An object of the present invention is to provide a filter of the above kind having an improved cartridge adapted to operate efficiently for a relatively long period of time, and embodying coarse and fine absorbent filtering media which respectively afford an initial stage of coarse filtration and high moisture and acid absorption, and a second stage of fine filtration and low moisture and acid absorption.

Another object is to provide efficient means whereby the oil is caused to first flow through the coarse filtering medium and then through the fine filtering medium, and whereby the filtering media are prevented from clogging the oil inlet and outlet perforations respectively provided in the shell and in the central tube of the cartridge.

Other objects and features of the invention will be apparent from the following description when considered with the accompanying drawing, in which.

Figure 1:
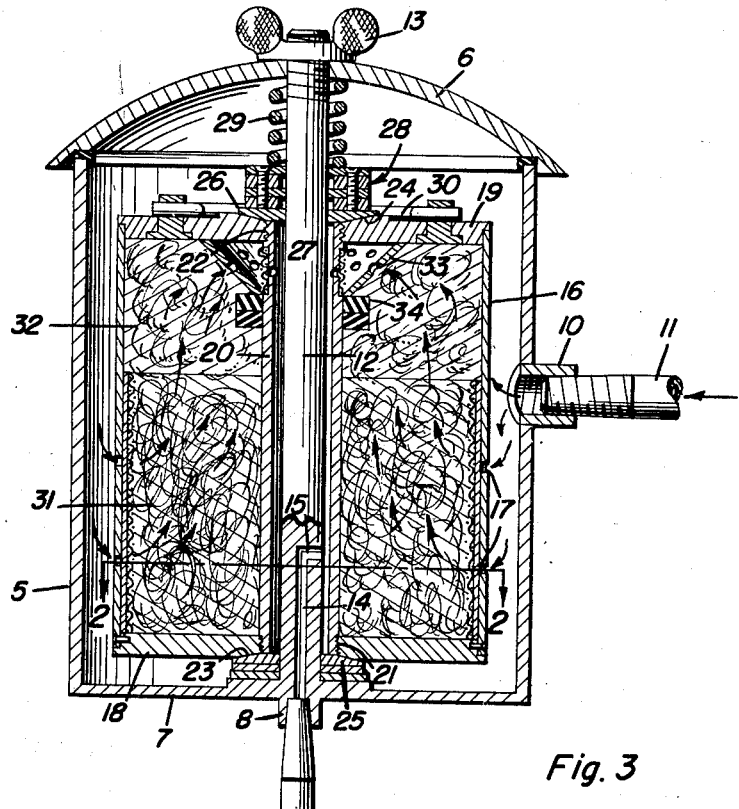
Figure 1 is a central vertical sectional view of a filter embodying the present invention.
Figure 3:
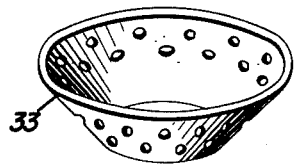
Figure 3 is a perspective view of the hollow frusto-conical perforated member which forms a part of the cartridge.
Figure 2:
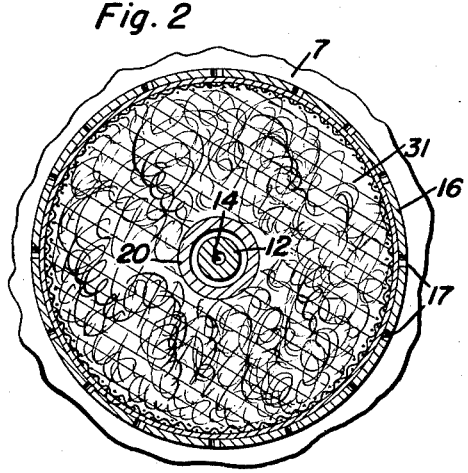
Figure 2 is a fragmentary horizontal section taken on the line 2—2 of Figure 1.

Referring in detail to the drawing, 5 indicates the cup-shaped imperforated body of a cylindrical casing which also includes a domed cover 6 detachably secured on the top of said body. The bottom 7 of the body 5 has a central outlet nipple 8 for connection with an oil conducting pipe 9, and said body has a side inlet nipple 10 for connection with an oil conducting pipe 11. A rod or post 12 is fixed at its lower end to the bottom 7 of the body 5 centrally of the latter, and this rod projects above the top of body 5 and through a central opening in the cover 6. A wing nut 13 is screwed onto the upper end of rod 10 and down against the cover 6 to detachably secure the latter on the body 5. The lower end portion of rod 12 is provided with an axial passage 14, the lower end of which communicates with the bore of nipple 8, and a transverse passage 15 extends from the upper end of passage 14 to the periphery of the rod 12.

Arranged within the casing is a cartridge which includes a filtering media container embodying a cylindrical shell 16 having an imperforate upper portion and provided with screened perforations 17 in the lower portion thereof, an imperforate bottom wall 18, an imperforate removable lid 19, and a central tube 20 having its lower end fixed or tightly threaded as at 21 in a central opening of the bottom wall 18 and its upper end received in a central opening of the lid 19. The lid is preferably removably screwed onto the upper end of tube 20 as at 22. The outer surfaces of the bottom wall 18 and the lid 19 are recessed to provide tapered seats 23 and 24 about the central openings thereof, and these seats are respectively engaged by the tapered faces of washers 25 and 26 snugly fitted on the rod 12 to prevent escape of oil from the ends of the tube 20. Near its upper end, the tube 20 is provided with screened inlet perforations 27 located directly under the lid 19.

A combined oil seal and follower 28 is slidably fitted on the rod 12 and disposed upon the washer 24, and a helical compression spring 29 is disposed on said rod between the seal and follower 28 and the casing cover 6 to press the cartridge down against the washer 25 and the washer 26 down against the lid 19. Lid 19 preferably has a hinged handle 30 for use in applying and removing the same.

The lower portion of the container of the cartridge is filled with a coarse absorbent filtering medium 31 which affords an intial stage of coarse filtration and high moisture and acid absorption. I have found as unexpectedly efficient for this purpose commercial mercerized thread cotton waste, which consists of a tangled mass of crinkled threads, which resists ready dense packing of the same, and which has numerous cavities that allow room for expansion upon absorption of water and acid and provide considerable space for reception of solids removed from the oil. The upper portion of this container is substantially filled with a fine or dense absorbent filtering medium 32 which affords a second stage of fine filtration and which preferably consists of cotton batting. This medium is held away from and prevented from clogging the perforations 27 of tube 20 by means of an inverted hollow frusto-conical perforated member 33 fitted on the upper portion of the tube 20 and resting at its lower smaller end on a resilient washer 34 snugly fitted on said tube immediately below said perforations. The larger upper end of the member 33 engages the under side of lid 19, and the lid presses and holds the member 33 down on the washer 34, so that oil must pass from the medium 32 through the perforations of and into member 33 before entering the perforations 27 of tube 20. The oil then passes down in tube 20, and through passages 15 and 14 to pipe 9. Obviously, the oil enters the casing under pressure from pipe 11 and fills the space between the casing and the cartridge, ultimately entering the container of the cartridge through the perforations 17 and flowing upwardly through the media 31 and 32 before passing into the member 33.

From the foregoing description, the nature and advantages of the present invention will be apparent to and appreciated by those skilled in the art. Modifications and changes in details of construction are contemplated within the spirit of the invention as claimed.

Having described the invention, what is claimed as new is:

1. In an oil filter, a cartridge comprising a container, said container embodying a cylindrical shell having an imperforate upper portion and provided with perforations in its lower portion, an imperforate bottom having a central opening, a removable imperforate lid having a central opening, and a central tube having its lower end fixed in the central opening of the bottom and its upper end removably received in the central opening of the lid, said tube having perforations near its upper end and being otherwise imperforate, a coarse absorbent filtering material in the lower portion of said container, a fine absorbent filtering medium in the upper portion of said container, a resilient washer fitted on said tube immediately below its perforations, and an inverted frusto-conical perforated member fitted on the tube to keep the fine filtering medium away from and prevent it from clogging the perforations of the tube, said frusto-conical member being engaged at its upper larger end with the under side of the lid and having its lower end pressed by said lid down on said washer.

2. The construction defined in claim 1, wherein the lid is screwed onto the upper end of the tube, said bottom and said lid having their outer surfaces recessed to form tapered seats about the central openings thereof for engagement with washers to seal the ends of the tube with respect to the central post of a filter casing extended through said tube, and tapered washers seated in said seats and engaging the opposite ends of said tube.

3. In an oil filter, an upstanding cylindrical casing including a cylindrical side wall and top and bottom walls, said top and bottom walls having axial openings, a vertical tube in the casing and fitted into the openings, said tube having openings therein below the top wall of the casing, a washer on the tube below the openings, a perforated frusto-conical member surrounding the tube and having its minor end seated on the washer and its major end seated against the underside of the top wall, a coarse filtering material filling the lower portion of the annular space in the casing below the washer and surrounding the tube, relatively finer filtering material overlying the coarse filtering material and filling the remainder of the annular space in the casing surrounding the frusto-conical member and the tube, the side wall of the casing having openings therein below the juncture of the filtering materials, whereby a dirty liquid may be forced into the casing through the latter mentioned openings and thence pass upwardly in the casing sequentially through the coarse and relative fine filtering materials to be finally discharged in a cleaned state into the tube upon passing through the frusto-conical member and the openings in the tube.

4. In an oil filter, an upstanding cylindrical casing including a cylindrical side wall and top and bottom walls, said top and bottom walls having axial openings, a vertical tube in the casing and fitted into the openings, said tube having openings therein below the top wall of the casing, a resilient washer snugly fitted on the tube below the openings, a perforated frusto-conical member surrounding the tube and having its minor end seated on the washer and its major end seated against the underside of the top wall, a coarse filtering material filling the lower portions of the annular space in the casing below the washer and surrounding the tube, relatively finer filtering material overlying the coarse filtering material and filling the remainder of the annular space in the casing surrounding the frusto-conical member and the tube, the side wall of the casing having openings therein below the juncture of the filtering materials, whereby a dirty liquid may be forced into the casing through the latter mentioned openings and thence pass upwardly in the casing sequentially through the coarse and relative fine filtering materials to be finally discharged in a cleaned state into the tube upon passing through the frusto-conical member and the openings in the tube.

THOMAS S. LASKY.

REFERENCES CITED

The following references are of record in the file of this patent:

UNITED STATES PATENTS

| Number | Name | Date |
|---|---|---|
| 2,088,222 | White | July 27, 1937 |
| 2,092,749 | Bradshaw | Sept. 14, 1937 |
| 2,110,318 | Baruch | Mar. 8, 1938 |
| 2,168,125 | Hurn | Aug. 1, 1939 |
| 2,201,418 | Williams et al. | May 21, 1940 |
| 2,232,423 | Alkire | Feb. 18, 1941 |
| 2,325,657 | Burkness | Aug. 3, 1943 |
| 2,487,146 | Lasky | Nov. 8, 1949 |
| 2,522,975 | Voorhees | Sept. 19, 1950 |
| 2,543,481 | Wicks et al. | Feb. 27, 1951 |